(12) United States Patent
Reid (10) Patent No.: US 6,774,783 B1
(45) Date of Patent: Aug. 10, 2004

(54) OPERATION READY SIGNAL LIGHT DEVICE

(75) Inventor: James J. Reid, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/248,763

(22) Filed: Feb. 14, 2003

(51) Int. Cl.[7] .............................................. G08B 26/00
(52) U.S. Cl. ................. 340/505; 340/539.13; 340/5.92; 340/825.36; 340/825.49; 235/385; 705/28; 705/29
(58) Field of Search ........................... 340/505, 539.13, 340/5.26, 5.5, 5.92, 825.36, 825.49; 235/375, 385; 705/28, 29

(56) References Cited

U.S. PATENT DOCUMENTS

| | | | | | |
|---|---|---|---|---|---|
| 4,519,522 A | * | 5/1985 | McElwee | ..................... | 221/13 |
| 4,642,017 A | * | 2/1987 | Fenn | ........................... | 414/348 |
| 4,796,209 A | * | 1/1989 | Burk | ........................... | 700/302 |
| 5,812,986 A | * | 9/1998 | Danelski | ...................... | 705/22 |
| 6,650,225 B2 | * | 11/2003 | Bastian et al. | ............. | 340/5.92 |
| 6,694,217 B2 | * | 2/2004 | Bloom | ........................ | 700/215 |

* cited by examiner

Primary Examiner—Daryl Pope
(74) Attorney, Agent, or Firm—Oliff & Berridge, PLC (57) ABSTRACT

A method of identifying a part with a storage location including the steps of transmitting identification information for the part and the storage location to a support system, supplying power to the remote device, transmitting a code sequence, associated with the transmitted identification information, from the support system to the remote device, wherein the code sequence is a random code whose sequence is changed to a different code sequence when power is removed from the remote device and notifying an operator externally when attempting to locate the storage location.

6 Claims, 9 Drawing Sheets

OPERATION READY SIGNAL LIGHT DEVICE

BACKGROUND OF THE INVENTION

1. Field of Invention

This invention relates to a signaling system that provides rapid visual location identification for manufacturing and warehousing.

2. Description of Related Art

In a typical assembly operation, a plurality of parts, stored on separate shelf, bin or general storage locations, are collected and combined to form a unit. When an operator, i.e., a manufacturer, wants to assemble a unit, the operator moves to a first storage location and collects a first part. The operator then moves to a second storage location and collects a second part. Thereafter, the operator can either combine the first and second parts or move to a third storage location and obtain a third part. This process continues until all parts have been collected and/or assembled together to form a unit. This operation is typically used in assembly or kitting, model mix and build-to-order operations, where a plurality of parts are used to either make a unit or for the collection of a plurality of individual parts for shipping to a second location for assembly.

SUMMARY OF THE INVENTION

When a unit only includes a few individual parts which are clearly distinct from each other, an operator with a minimum amount of training can easily move to the corresponding limited number of storage locations to obtain these few individual parts. Thereafter, the operator can easily assemble the few individual parts or collect the few individual parts for shipping.

However, when a complex unit is required, a large number of individual parts may be required. To collect the large number of individual parts, a skilled operator must identify the individual storage locations to collect these individual parts. To assist the operator in identifying the parts, the operator can use a written list to identify each part. However, using a list can be time consuming because the operator has to identify the part on the list, find the storage location, and match the part at the storage location with the list.

Operator errors are further available in collecting a part when subtle differences exist between individual parts. Thus, the operator can pick the wrong part at the wrong storage location by failing to notice the subtle difference. Furthermore, the time required to collect parts is increased because the operator needs additional time to search for the part and match the part at the storage location with the list.

Alternatively, these operator errors also exist when restocking a storage location because the operator must identify the part, find the storage location and match the storage location with the part. The operator can thus make a mistake in placing the part at the wrong storage location.

This invention provides a signaling device that illuminates when a remote signal is received to provide rapid visual location identification for manufacturing and warehousing.

This invention separately provides systems and methods that use rolling code decoder technology for storing storage location information in a remote device.

This invention separately provides systems and methods that use a decoder to call storage locations by visual indication to improve productivity, for ergonomic improvement and/or for inventory error reduction.

This invention separately provides systems and methods that use an integrated device design, where a generic device can be associated with its physical location remotely with operator action and then provide a visual display.

This invention separately provides systems and methods that use a rolling code decoder for establishing a location identification.

This invention separately provides systems and methods that use pager technology for calling part locations.

This invention separately provides systems and methods that use a teach/learn sequence where the device is associated with a physical location.

This invention separately provides systems and methods that use decoder technology to create a low cost paperless process for assembly and order pickup operations.

In various exemplary embodiments of the systems and methods for a signaling system according to this invention, rapid visual identification is achieved for an assembly operation, a part collection operation and/or a put-away operation. The rapid visual identification is achieved by sending a signal from a support system to a remote device, where the remote device signals to the user the proper location to obtain or deposit a particular part.

In various exemplary embodiments, a signal is sent from the support system to the remote device by using a teach/learn sequence. In using the teach/learn sequence, the user enters a location identification number and a detailed description of the location of the storage device into a database by first scanning a location identifier to begin the teach/learn sequence. The location identification number and the detailed description are then scanned to associate the part with a storage location. The remote device is then activated. A signal is then sent to the remote device and the device will indicate whether it has been activated. If the remote device indicates that it has been activated, the storage location is established.

These and other features and inventions of this invention are described and are apparent from the detailed description of various exemplary embodiments of the systems and methods according to this invention.

BRIEF DESCRIPTION OF THE DRAWINGS

Various exemplary embodiments of the invention will be described in detail with reference to the following figures, where like numerals represent like elements and wherein.

FIG. 8 is a flowchart outlining one exemplary embodiment of a method for using the indication system during a non-sequential pick-up operation according to this invention. and.

DETAILED DESCRIPTION OF EXEMPLARY EMBODIMENTS

The following detailed description of various exemplary embodiments of a location indication system 100 according to this invention are directed to one specific type of location indication system 100 for the sake of clarity and familiarity. However, it should be appreciated that the principles of this invention, as outlined and/or discussed below, can be equally applied to any embodiment of a location indication system, beyond the specific embodiment of the location indication system 100 discussed herein.

Figure 1:
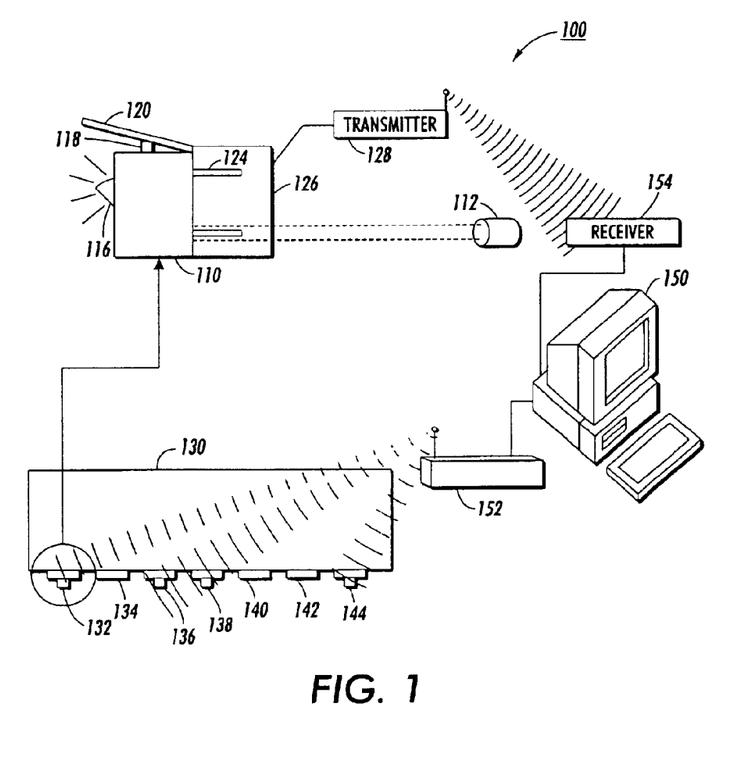
FIG. 1 illustrates a signal system according to an exemplary embodiment of the invention.

As shown in FIG. 1, the location indication system 100 includes one or more remote devices 110 located at each of one or more storage locations 132–144 on a shelf 130. The location indication system 100 also includes a support system 150 that transmits a signal using a transmitter 152 to the remote devices 110.

In various exemplary embodiments, the support system 150 is implemented using a programmed general purpose computer. It should be appreciated that the support system 150 can alternatively be implemented using a special purpose integrated circuit having a main or central processor section for overall, system level control, and a separate section dedicated to performing various different specific computations, functions and other processes under the control of the central processor section. The support system 150 can alternatively be implemented using a plurality of separate dedicated or programmable integrated or other electronic circuits or devices, such as, for example, hardwired electronic or logic circuits such as discrete element circuits, or programmable logic devices such as PLDs, PLAs, PALs or the like. The support system 150 can be implemented using a suitably programmed general purpose computer, for example, a microprocessor, microcontroller or other processor device (CPU or MPU), either alone or in conjunction with one or more peripheral (example integrated circuit) data and signal processing devices. In general, any device or assembly of devices on which a finite state machine capable of implementing the procedures described herein can be used as the support system 150. A distributed processing architecture can be used for maximum data/signal processing capability and speed.

The support system 150 stores a plurality of information within its memory for the collection, assembly and/or put away operation for a plurality of parts. Such information includes detailed identification information for individual units and the associated parts for the assembly, collection or identification of parts for that individual unit. Also included is information regarding the exact location of a storage location 132–144 such that a user can identify a building, zone, area, rack or any other location such that the user can determine where to pick up or put away a part.

To indicate to the user a desired storage location 132–144, the support system 150 sends a signal through the transmitter 152. The transmitter 152 thereafter sends a signal to a receiver 112 located within a particular remote device 110. In various exemplary embodiments, the signal transmitter 152 will transmit a radio frequency. However, it should be appreciated that signals using other electromagnetic frequencies may be transmitted so long as such frequencies can be received by the receiver 112 of the remote device 110. For example, an infrared signal may be used where beam range limits are needed.

Figure 2:
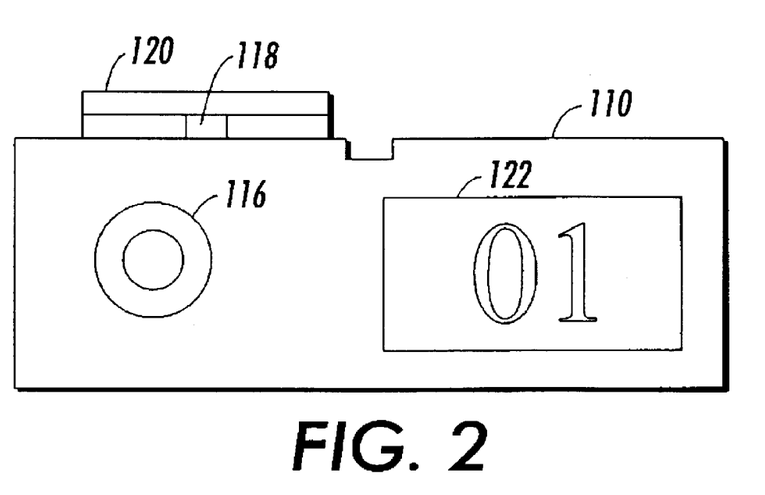
FIGS. 2–4 illustrate one exemplary embodiment of a remote device according to the invention.
Figure 3:
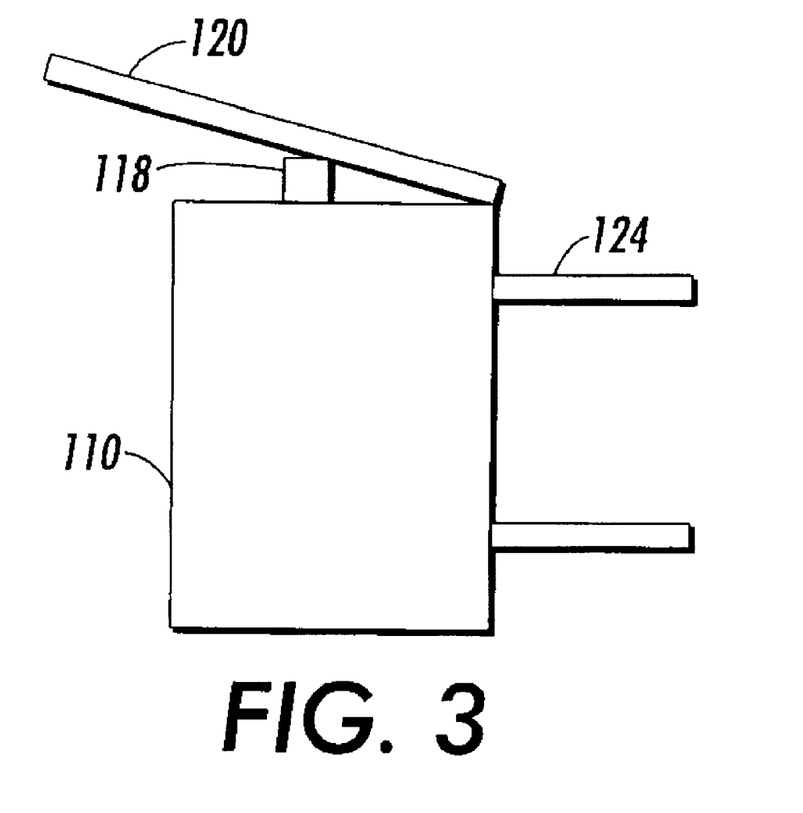
Figure 4:
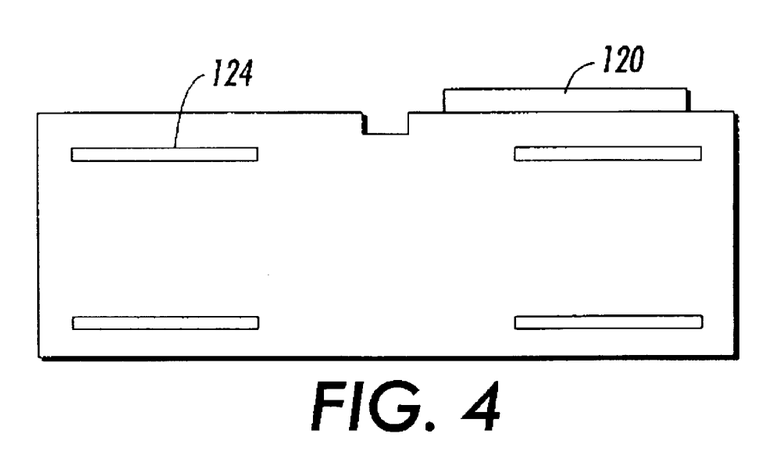
Figure 5:
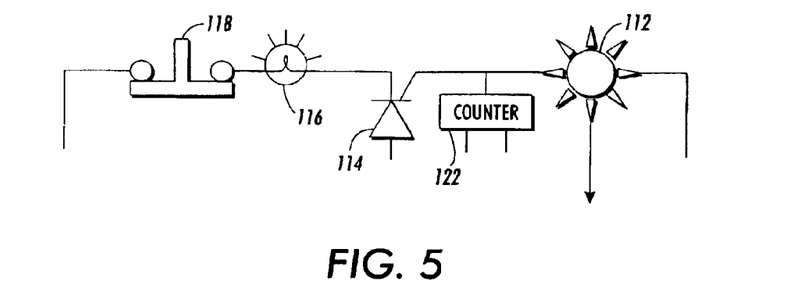
FIG. 5 illustrates one exemplary embodiment of a device circuit for the remote device according to the invention.

FIGS. 2–4 shows an exemplary embodiment of a remote device 110. FIGS. 2–4 show an exemplary embodiment of the outer structure of the remote device 110. FIG. 5 shows an exemplary embodiment of an electrical circuit within the device 110. The remote device 110, in various exemplary embodiments, includes a receiver 112, a control switch 114, and indicator light 116 and a reset switch 118.

The receiver 112 receives a signal from the transmitter 152. A control switch 114 is electrically connected to the receiver 112. Upon receiving a signal from the transmitter 152, the receiver 112 will apply a forward bias to the control switch 114. The control switch 114 remains forward biased until the circuit is interrupted. The indicator light 116 is electrically connected to the control switch 114. Upon being placed into the forward bias condition, the control switch 114 supplies electric current to the indicator light 116, to cause the indicator light 116 to emit light.

A cancel switch 118 is electrically connected to the indicator light 116. The cancel switch 118 is normally at a first position, indicated in FIG. 5, where the electrical connection of the circuit is maintained. The cancel switch 118 is movable to a second position to interrupt the continuity of the circuit. Once the cancel switch 118 has been moved to the second position, the electric current to the indicator light 116 has been interrupted. Thus, turning off the indicator light 116. In various exemplary embodiments, a lever 120 is used to move the cancel switch 118 from the first position to the second position.

After the cancel switch 118 has been moved to the second location, a transmitter 128 associated with the remote device 110 sends a signal to a receiver 154 connected to the support system 150. Similarly, as discussed above for the transmitter 152 and receiver 112, the receiver 154 connected to the support system 150 receives a signal from the transmitter 128 connected to the remote device 110 with a similar signal.

In other exemplary embodiments, a portable transmitter can be used instead of the transmitter 128 connected to the remote device 110. Thus, along with the cancel switch being move to the second position, the user can use the portable transmitter to send a signal which is received by the receiver 154 connected to the support system 150.

In various exemplary embodiments, an index counter 122 is located between the receiver 112 and switch 114. The index counter 122 indicates the number of parts required for that particular remote device 110. In various exemplary embodiments, the index counter 122 is a numerical counter. However, it should be appreciated that any known or later-developed counter can be used to indicate to a user the number of parts required at a given location using the remote device 110. In further exemplary embodiments, instead of a counter 120, multiple devices 110 may be used for the same part. Thus, in this embodiment, the number of energized indicator lights 116 will equal the total required number of that part.

In various exemplary embodiments, the remote device 110 is supplied with electrical power via a plug 124, which is inserted into an electrical outlet. As shown in FIG. 1, in various exemplary embodiments, the electrical outlet is a power strip 126. In various exemplary embodiments, the power strip 126 is a continuous slot outlet power strip placed along the shelf edge or other location. As should be appreciated, a voltage current is supplied from the strip 126 to the plug 124. However, as should be appreciated, alternate power supply systems could be used to supply electrical power to the remote device 110.

The remote device 110 can be imprinted with identification information to describe the part, including, but not limited the manufacturers part number, the user"s identification number, a brief description of the part, or any other means for describing that part. The remote device 110 can also be imprinted with information regarding the exact location of a storage location 132–144 such that a user can identify a building, zone, area, rack and/or any other location information used to locate a part.

When appropriate, a signal is sent from the transmitter 152 to the receiver 112 of a specific remote device 110 to indicate that a pick-up or a put-away operation is needed at that shelf location. When a signal is received, the indicator light 116 on that remote device 110 will be turned on. The indicator light 116 is turned off after the pick-up or put-away operation by the operator actuating the cancel switch 118. Furthermore, if the remote device 110 contains the index counter 122, the index counter 122 will display the number of signals it has received and reset when the cancel switch 118 is activated.

Figure 6:
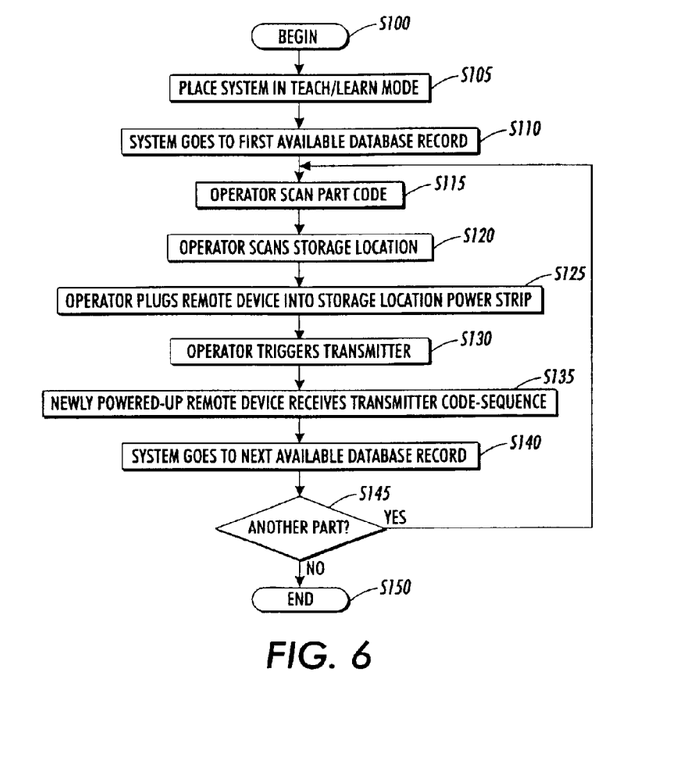
FIG. 6 is a flowchart outlining one exemplary embodiment of a method for assigning a new storage location to a receiver according to this invention.

FIG. 6 is a flowchart outlining one exemplary embodiment of a teach/learn operation of the location indication system. The teach/learn sequence is used to associate an individual part with a storage location. Once the part has been associated with a storage location, the support system can thereafter transmit signals from the transmitter to the receiver placed at that storage location.

Operation starts at step S100, and proceeds to S105, wherein the light indication system is placed in a teach/learn mode. In step S110, the support system goes to the first available database record in the memory of the support system in order to store information regarding an individual part with a storage location. In steps S115 and S120, the part label and the specific storage location label are thereafter scanned to associate the part with a specific shelf location. As such, the support system stores the identification information for a particular part for a particular storage location with the first available database record located in the memory of the support system.

Then, in step S125, the remote device is plugged into a power strip that is associated with the scanned storage location. In step S130, after the remote device has been plugged into the power strip, a location code signal is sent from the transmitter associated with support system to activate the indicator light for that remote device. Also, in step S135, the newly powered remote device receives a transmitter code sequence. As such, when a remote device is plugged in, a portion of the transmitter code sequence becomes a string of zeros. The remote device recognizes that the sequence is incorrect and captures the next transmitter code sequence which is transmitted and retains that code until it is unplugged or reset: As should be appreciated, the remote device is plugged into a power strip as discussed above. Alternatively, the remote devices may be self powered with a reset button which selectively removes power from the remote device. As such, when the remote device is unplugged or reset, the transmitter code is automatically reset with a new transmitter code sequence. Thus, the remote device is not retained in an inappropriate transmitter code sequence when it is relocated because the transmitter code sequence is reset.

Then, in step S140, the support system then goes to the next available database record in the memory of the support system in order to store information regarding another individual part with another storage location.

In step S145, a determination is made as to whether another remote device is to be associated with another storage location for locating another part. If another remote device is to be added, operation returns to step S115.

Otherwise, operation continues to step S150, where the teach/learn operation ends.

As discussed, when a remote device is unplugged or removed from a specific remote location, the transmitter code sequence for that storage location is reset. As such, that specific remote device will reset and go through the teach/learn operation outlined in FIG. 6. As such, the remote devices are generic, low cost units that do not require tracking.

After all the locations and parts have been recorded and the corresponding remote devices have been encoded, a pick-up or assembly operation sequence can be initiated. Depending on the request, the support system can either transmit a list of part location codes for a particular order or transmit a list for an assembly sequence.

Figure 7:
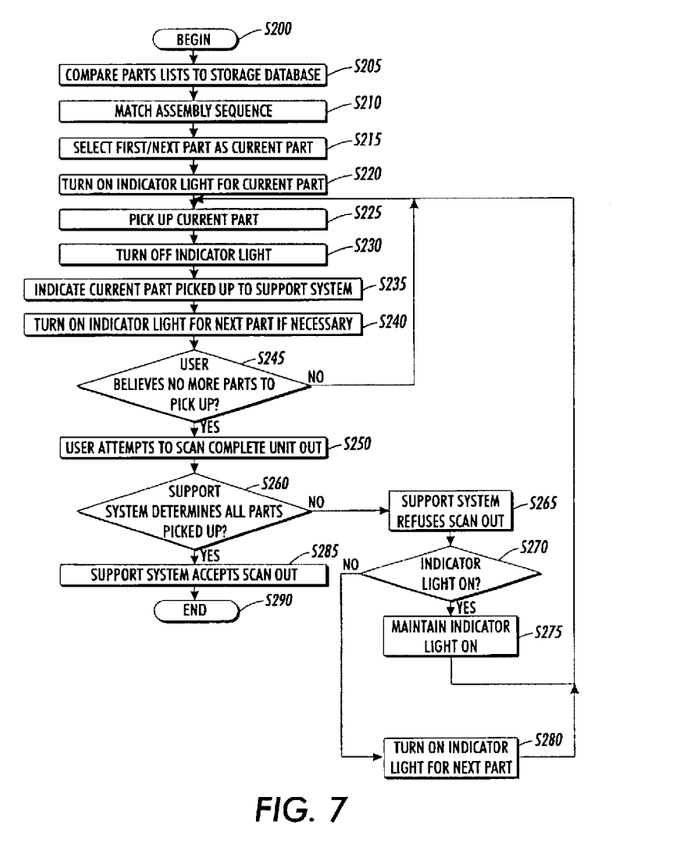
FIG. 7 is a flowchart outlining one exemplary embodiment of a method for using the indicator system during a sequential pick-up operation according to this invention.

FIG. 7 is a flowchart outlining one exemplary embodiment of assembly operation of the location indication system. The assembly operation is used in model-mix and ship-to-order operations wherein an assembler may be handling the similar components sequentially. The assembly operation is also useful in reducing the operator training and ergonomic job rotation.

The operation starts at step S200, and proceeds to step S205 wherein a unit is input either manually or automatically into the support system. The support system then compares the part lists to the storage database. Then, in step S210, the support system matches the assembly sequence. In matching the assembly sequence, the support system compares a part list to a storage database, and then filters and sorts the part list to match an assembly sequence.

In step S215, the support system selects the first part as the current part. Then, in step S220, the support system sends a signal through the transmitter to the remote device in order to obtain the current part. By sending a signal to the remote device, the indicator light for that remote device is turned on.

In step S225, the operator moves over to the remote device at the given storage location and picks up the current part. Thereafter, in step S230, the operator turns off the indicator light. By turning off the indicator light, in step S235, the remote device sends a signal through the transmitter to the receiver of the support system to indicate to the support system that the current part has been picked up. Then, in step S240, the support system sends a signal through the transmitter to turn on the indicator light for the next remote device, if necessary. If another part is not necessary, the support system does not send a signal to the remote device.

In step S245, a determination is made by the user as to whether he believes no more parts need to be picked up, i.e., he believes the assembly sequences have been completed. If the user believes that all the parts have not been picked up, the operation proceeds to step S225 where the operator will pick up the next part. However, if the operator believes all the parts have been picked up, the operation proceeds to step S250.

In step S250, the user attempts to scan out the complete unit using a handheld scanner associated with the support system. After all the parts have been scanned into the support system, a determination is made in step S260 by the support system as to whether all the parts have been picked up. An error may occur in failing to pick up all the parts when either the operator turns on the indicator light but fails to pick up the part, has lost the part during the assembly operation, or has simply failed to scan the part when scanning out. If the support system determines all the parts have been picked up, the support system accepts the scan out at S285 and the process thereafter ends at step S290. However, if all the parts have not been picked up, the operation proceeds to step S265 where the support system refuses to scan out the unit.

In step S270, a determination is made as to whether an indicator light is on. If an indicator is on for at least one remote device, the support system maintains the indicator light on in step S275. Otherwise in step S280, the support system turns on the indicator light for the next part where the process thereafter returns to step S225.

Figure 8:
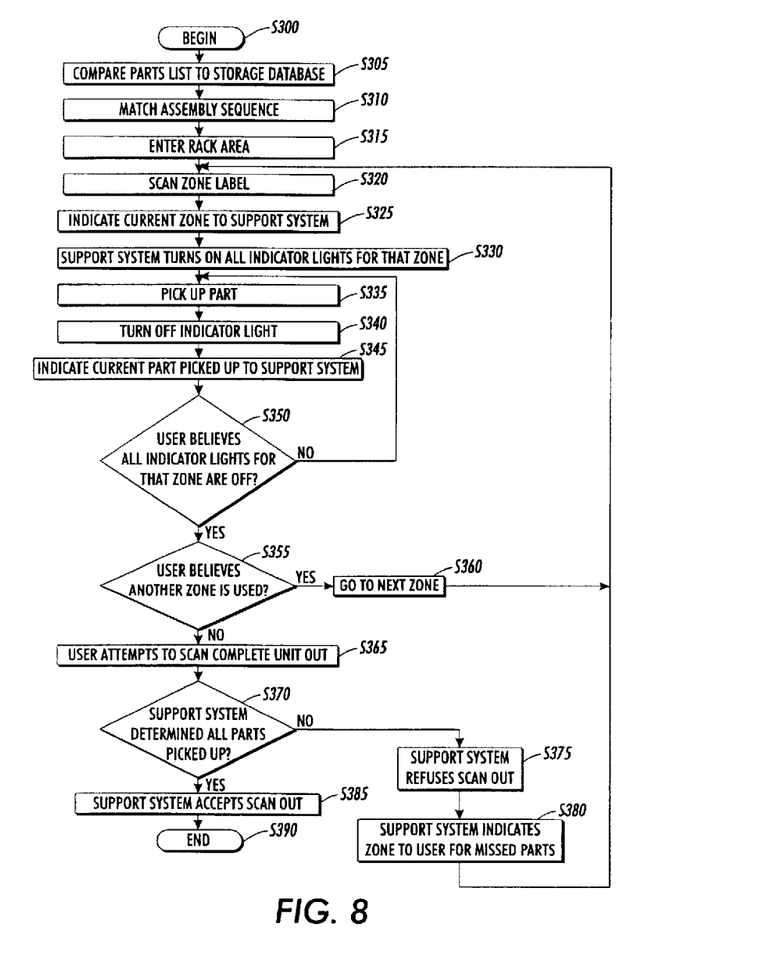

FIG. 7 is a flowchart outlining one exemplary embodiment of the pickup operation for line supply, kitting, indicating an order pickup for customer shipments. The flowchart of FIG. 8 is similar to FIG. 7, however, when using the pick up operation, a plurality of parts are picked up at a given zone, i.e., area, before moving on to another zone. Furthermore, in the pick up operation of FIG. 8, the order in which the parts are picked up are not material to the operation.

The operation starts at step S300 and proceeds to step S305 where the system manually or automatically starts an operation. The support system thereafter compares the part list to the storage database S305. The support system will then compare the parts list to the storage database, filter and sort the parts to match the requested order.

In step S315, an operator will enter into a rack area. Then, in step S320, the apparatus scans a zone label with a handheld transmitter. In step S325, a signal is sent from the handheld transmitter to the support system to indicate the current zone in which a user is present. It should be appreciated that the zone is any sizeable area in which a plurality of shelf locations and remote devices are located.

In step S330, the support system turns on all the indicator lights for that zone. Then, in step S335, the operator will pick up a part. In step S340, the operator will turn off the indicator light for the remote device at that storage location. Thereafter, in step S345 the signal is sent by the remote device through a transmitter to the support system to indicate the part has been picked up.

Then, in step S350, a determination is made as to whether the user believes all the indicator lights for that zone are off. If the user believes that an indicator light is on, the operation returns to step S335 where the operator picks up the next part. Otherwise, the operation proceeds to step S355.

In step S355, a determination is made as to whether another zone is used. If the user believes that another zone is used, the operation proceeds to step S360 where the operator will go to the next zone. Otherwise, the operation proceeds to step S365 with the user will attempt to scan out the complete unit.

In step S370, the support system determines if all of the parts have been picked up. If the support system determines that all of the parts have been picked up, the operation proceeds to step S385 where the support system accepts the scan out and the process thereafter ends at step S390. Otherwise, the operation proceeds to step S375.

In step S375, the support system 150 refuses the scan out. The support system refuses the scan out when either the operator fails to go to a zone, has failed to pick up a part, or has lost a part during a process of the pickup operation. Then, in step S380, the support system indicates the zone to the user of the missed part and the operation proceeds to step S320 where the operator will go the zone to pick up the part.

Figure 9:
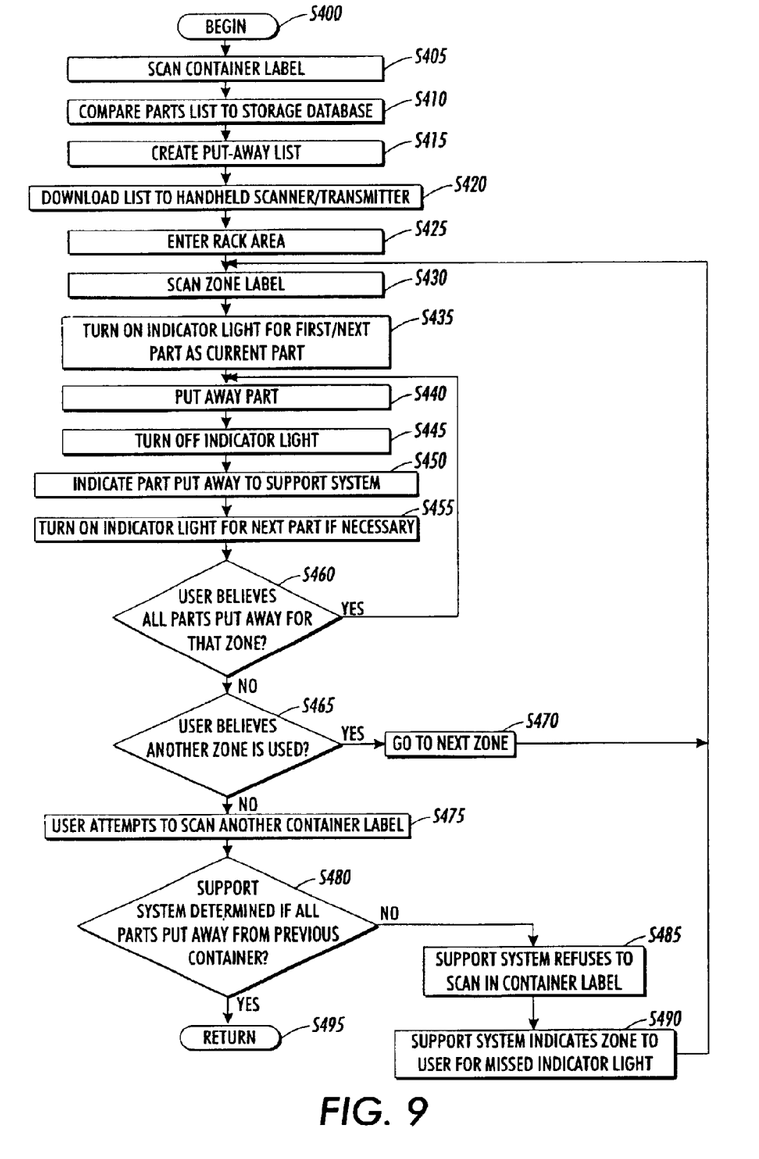
FIG. 9 is a flowchart outlining one exemplary embodiment of a method for using the indicator system during a put-away operation according to this invention.

FIG. 9 is a flowchart outlining one exemplary embodiment of a put-away operation. The put-away operation is used to restock a remote device and to avoid having parts placed at the wrong storage location.

The put-away operation begins in step S400 and proceeds to step S405. In step S405, the operator will scan the container label with a handheld transmitter. A signal is thereafter sent from the transmitter to the support system. In step S410, the support system then compares the parts list to the storage database. The support system then compares the parts list to the storage location list database, filters and sorts the database to match the most efficient sequence in order to store a part at a remote device. In step S415, the list thus created is the put-away list.

In step S420, the put-away list then downloaded to the handheld scanner. In step S425, the operator will then enter into a zone. In step S430, the operator then scans the zone label. In step S435, the support system will then turn on the indicator light for the first or next part as the current part.

In step S440, the operator will put away the part, and in step S445, will turn off the indicator light. In step S450, the remote device will then send a signal through a transmitter to the support system to indicate that the part has been put away.

In step S455, the support system will then turn on the indicator light for the next part, if necessary. If another part is put away, the support system will not turn on another indicator light.

In step S460, a determination is made by the user as to whether all the parts have been put away for that zone. If the user does not believe that all of the parts for that zone have been put away, the operation returns to step S440. Otherwise, the operation proceeds to step S465.

In step S465, a determination is made by the user as to whether a part has to be placed in another zone. If the user believes another zone is used, the operator, in step S470, will proceed to the next zone. Otherwise, the operation proceeds to step S475.

In step S475, the user will attempt to scan another container label for another put-away operation. In step S480, a determination is made as to whether all the parts from the previous container have been put away. If the support system determines that all the parts have been put away, the operation returns to step S495 and the process ends. Otherwise, the operation proceeds to step S485.

In step S485, the support system refuses to scan any container label because all of the parts from a previous put-away operation has not been completed. Then, in step S490, the support system indicates to the operator the remote devices in which a part was not placed. Thus, an operator can determine whether he has failed to put all the parts away or has misplaced a particular part.

While this invention has been described in conjunction with the exemplary embodiment outlined above, it is evident that many alternatives, modifications and variations with be apparent to those skilled in the art. Quite, exemplary of embodiment of the invention, as set forth above, are intended to be illustrative, not limiting. Various changes may be made without departing from the spirit and scope of the invention.

What is claimed is:

1. A method of identifying a part with a storage location, comprising:

transmitting identification information for the part and the storage location to a support system;

supplying power to a remote device;

transmitting a code sequence, associated with the transmitted identification information, from the support system to the remote device, wherein the code sequence is a random code whose sequence is changed to a different code sequence when power is removed from the remote device; and notifying an operator externally when attempting to locate the storage location.

2. The method of claim 1, wherein the part is identified for an assembly operation, a part collection operation and/or a put-away operation.

3. The method of claim 1, wherein the identification information for the part and the storage location is transmitted to a first available database record.

4. The method of claim 1, wherein a plurality of storage locations receive power from a common power supply with power outlets located at each storage location.

5. The method of claim 1, wherein the remote device is self powered wherein power is removed from the remote device when the remote device is reset.

6. The method of claim 1, wherein the random code is a rolling code sequence.

* * * * *